United States Patent
Low et al.

(10) Patent No.: US 10,023,120 B2
(45) Date of Patent: Jul. 17, 2018

(54) MULTI-PURPOSE CAMERA DEVICE FOR USE ON A VEHICLE

(71) Applicant: Delphi Technologies, Inc., Troy, MI (US)

(72) Inventors: Yew Kwang Low, Singapore (SG); Kok Wee Yeo, Singapore (SG); Ronald M. Taylor, Greentown (IN)

(73) Assignee: Delphi Technologies, Inc., Troy, MI (US)

( * ) Notice: Subject to any disclaimer, the term of this patent is extended or adjusted under 35 U.S.C. 154(b) by 178 days.

(21) Appl. No.: 15/084,856

(22) Filed: Mar. 30, 2016

(65) Prior Publication Data

US 2017/0282795 A1   Oct. 5, 2017

(51) Int. Cl.
| | |
|---|---|
| *H04N 7/18* | (2006.01) |
| *H04N 9/47* | (2006.01) |
| *B60R 1/00* | (2006.01) |
| *G02B 13/00* | (2006.01) |
| *G02B 27/00* | (2006.01) |
| *H04N 5/77* | (2006.01) |
| *H04N 5/225* | (2006.01) |

(52) U.S. Cl.
CPC ............ *B60R 1/00* (2013.01); *G02B 13/0055* (2013.01); *G02B 27/0025* (2013.01); *H04N 5/2254* (2013.01); *H04N 5/772* (2013.01); *B60R 2300/108* (2013.01); *B60R 2300/806* (2013.01); *B60R 2300/8093* (2013.01)

(58) Field of Classification Search
CPC ................ B60R 1/00; B60R 2300/108; B60R 2300/8093; B60R 2300/806; H04N 5/2254; H04N 5/772; G02B 13/0055; G02B 27/0025

USPC ......................................................... 348/148
See application file for complete search history.

(56) References Cited

U.S. PATENT DOCUMENTS

| | | | |
|---|---|---|---|
| 6,052,355 A * | 4/2000 | Saito ..................... | G11B 7/1353 369/112.28 |
| 7,095,567 B2 | 8/2006 | Troxell et al. | |
| 2010/0194889 A1* | 8/2010 | Arndt ....................... | B60R 1/00 348/148 |
| 2011/0181728 A1* | 7/2011 | Tieman ..................... | B60R 1/00 348/148 |

(Continued)

FOREIGN PATENT DOCUMENTS

EP          1764835 A1     3/2007

*Primary Examiner* — Jared Walker
(74) *Attorney, Agent, or Firm* — Lawrence D. Hazelton

(57) ABSTRACT

An illustrative example camera device includes a sensor that is configured to detect radiation. A first portion of the sensor has a first field of vision and is used for a first imaging function. A distortion correction prism directs radiation outside the first field of vision toward the sensor. A lens element between the distortion correcting prism and the sensor includes a surface at an oblique angle relative to a sensor axis. The lens element directs radiation from the distortion correcting prism toward a second portion of the sensor that has a second field of vision and is used for a second imaging function. The sensor provides a first output for the first imaging function based on radiation detected at the first portion of the sensor. The sensor provides a second output for the second imaging function based on radiation detection at the second portion.

19 Claims, 4 Drawing Sheets

(56) References Cited

U.S. PATENT DOCUMENTS

2014/0132804 A1* 5/2014 Guissin ................ G02B 13/06
348/239
2016/0076934 A1 3/2016 Low et al.

* cited by examiner

MULTI-PURPOSE CAMERA DEVICE FOR USE ON A VEHICLE

TECHNICAL FIELD

The subject matter of this disclosure generally relates to cameras. More specifically, and without limitation, the subject matter of this disclosure pertains to a multi-function camera device for use on a vehicle.

DESCRIPTION OF THE RELATED ART

Over the last several decades there have been significant changes in camera technology. The proliferation of digital cameras and advances in associated technologies has made it possible to incorporate cameras in a variety of devices. Computers and mobile communication devices, such as smart phones, routinely include cameras. It is also becoming more commonplace to provide one or more cameras on an automotive vehicle to provide enhanced features, such as a parking assist function and collision avoidance assistance. It would be useful to be able to provide more advanced driver assist functions that incorporate or use a camera.

One of the challenges associated with enhancing camera capabilities on a vehicle is that different functionalities require different camera configurations. For example, an image detector used for an active safety function typically has a relatively narrow field of view. By contrast, a camera that provides a DVR function typically has a much wider field of view. Using different devices to realize these different functionalities increases cost and requires occupying additional space on the vehicle.

It would be useful to be able to provide more camera-based functionality on an automotive vehicle in a cost-effective and space-conserving manner

SUMMARY

An illustrative example embodiment of a camera device includes a sensor that is configured to detect radiation. A first portion of the sensor is used for a first imaging function. The first portion of the sensor has a first field of vision. A distortion correction prism is forward of the sensor and directs radiation outside of the first field of vision toward the sensor. A lens element is situated between the distortion correcting prism and the sensor. The lens element includes a surface facing toward the sensor. The surface is at an oblique angle relative to a sensor axis. The lens element directs radiation from the distortion correcting prism toward a second portion of the sensor. The second portion of the sensor is used for a second imaging function that is different than the first imaging function. The second portion of the sensor has a second field of vision outside of the first field of vision. The sensor provides a first output for the first imaging function based on radiation detected at the first portion of the sensor. The sensor provides a second output for the second imaging function based on radiation detected at the second portion.

An illustrative example method of operating a camera on a vehicle includes performing a first imaging function based on radiation detected by a first portion of a sensor configured to detect the radiation. The first portion of the sensor has a first field of vision. A second imaging function is performed based on radiation detected by a second portion of the sensor. The second portion of the sensor has a field of vision outside of the first field of vision. Radiation detected by the second portion first passes through a distortion correcting prism and then a lens element that has a surface that is at an oblique angle relative to a sensor axis. The lens element surface faces the sensor.

Various features and advantages of at least one disclosed example embodiment will become apparent to those skilled in the art from the following detailed description. The drawings that accompany the detailed description can be briefly described as follows.

DETAILED DESCRIPTION

Figure 1:
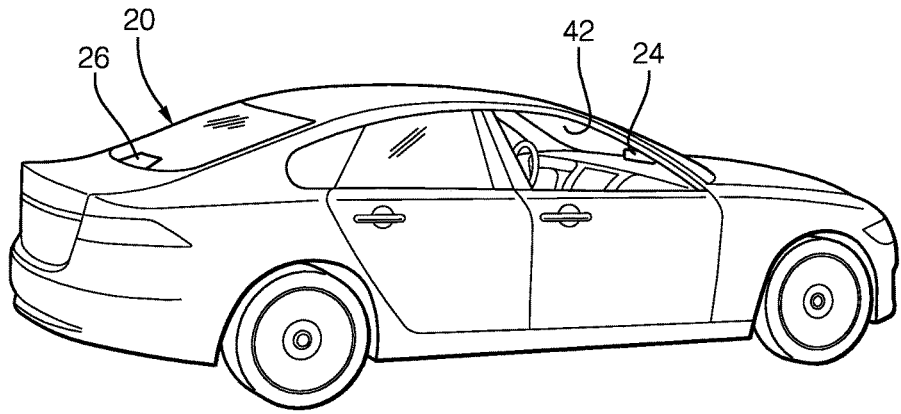
FIG. 1 diagrammatically illustrates an automotive vehicle including at least one camera device designed according to an embodiment of this invention.

FIG. 1 illustrates an automotive vehicle 20 that includes camera devices 24 and 26 that respectively perform multiple imaging functions. The camera device 24 is situated on the vehicle 20 in a forward-directed manner and the camera device 26 is oriented in a rearward-directed manner.

Figure 2:
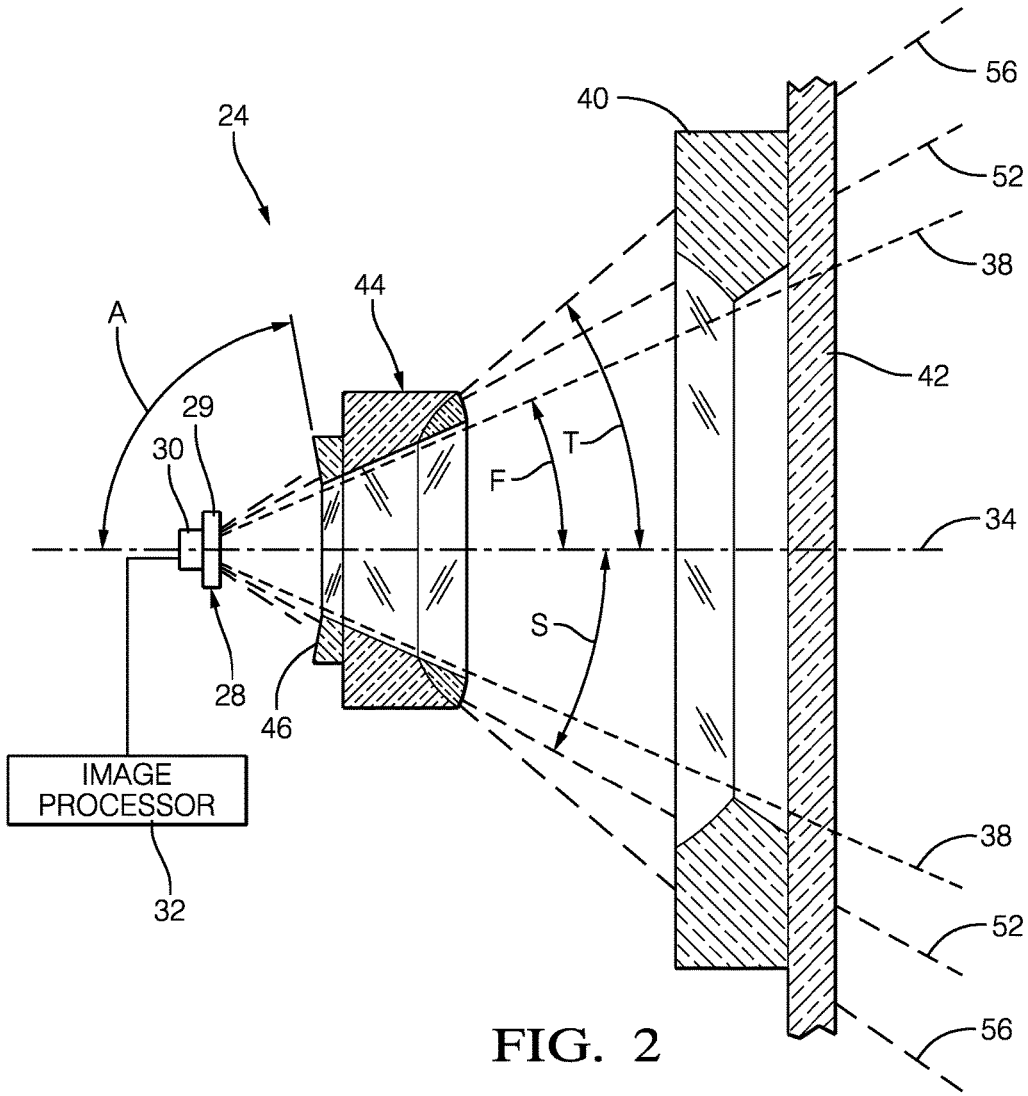
FIG. 2 is a cross-sectional view of selected portions of an example camera device embodiment illustrating selected features of that embodiment.
Figure 3:
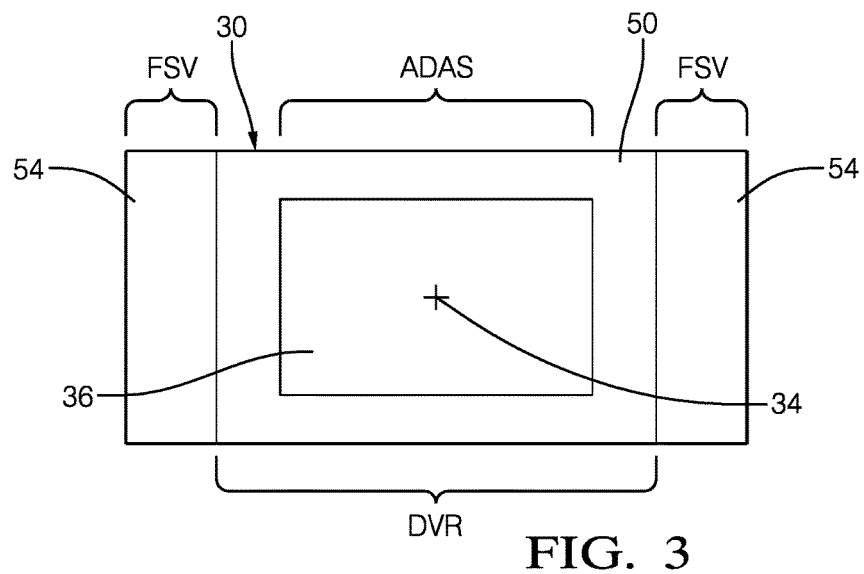
FIG. 3 schematically illustrates a sensor configuration of the embodiment of FIG. 2.

Referring to FIGS. 2 and 3, selected features of the example camera devices are illustrated. For discussion purposes the camera device 24 is shown. The camera device 26 may have the same features. The camera device 24 includes a camera portion 28 including a camera lens 29 and a sensor 30 that is configured to detect radiation, such as visible light. The sensor 30 is associated with an image processor 32 that includes appropriate electronics, programming, or both, to realize multiple imaging functions based on an output from the sensor 30 that corresponds to radiation detected by the sensor 30.

For discussion purposes, a sensor axis 34 is shown. In this example, the sensor 30 includes a planar detecting surface that is generally rectangular (as can be appreciated in FIG. 3). A first portion 36 of the sensor 30 is generally rectangular and symmetric about the sensor axis 34. The first portion 36 of the sensor 30 detects radiation for purposes of accomplishing a first imaging function. The first portion 36 of the sensor 30 has a first field of vision schematically shown having an outside edge 38. An angle between the outside edge 38 of the first field of vision and the sensor axis 34 in this example is between 25° and 40°.

The camera device 24 includes a distortion correcting prism 40 that is situated against a windshield 42 of the vehicle 20 in this example arrangement. The distortion correcting prism 40 facilitates directing radiation from outside the first field of vision of the first portion 36 toward another portion of the sensor 30. A lens element 44 is situated between the distortion correcting prism 40 and the sensor 30. The lens element 44 includes a surface 46 that faces toward the sensor 30. The surface 46 is at an oblique angle A relative to the sensor axis 34. In this example, the angle A is 85°. The angle A in other examples is between 80° and 89° relative to the sensor axis 34. The oblique angle A of the surface 46 facilitates directing radiation that has passed through the distortion correcting prism 40 onto a second portion of the sensor 30.

As shown in FIG. 3, a second portion 50 of the sensor 30 is configured to detect radiation that originates outside of the first field of vision of the first portion 36. In this example, the second portion 50 is generally rectangular and surrounds the first portion 36. In this example, the second portion 50 of the sensor 30 includes a portion of the detecting surface area that is between an outer edge of the first portion 36 and an outside edge of the detecting surface area of the sensor 30.

As shown in FIG. 2, the second portion 50 of the sensor 30 has a field of vision with an outside edge schematically shown at 52. The second field of vision is outside of the first field of vision, which has the outside edge 38, in this example. The outside edge 52 is situated at an angle S relative to the sensor axis 34. The angle S in this example is between 40° and 65°.

Radiation detected by the second portion 50 within the second field of vision is used for a second imaging function that is different than the first imaging function provided by the first portion 36 of the sensor 30. In this example, the sensor 30 provides a first output for the first imaging function and a second, different output for the second imaging function. The image processor 32 is configured, such as by suitable programming, to properly interpret the different outputs from the sensor 30 for purposes of providing the different imaging functions.

In the example of FIGS. 2 and 3, the camera device 24 provides a third imaging function. A third portion 54 of the detecting surface of the sensor 30 detects radiation within a third field of view having an outside edge schematically shown at 56, which is at an angle T relative to the sensor axis 34. In this example, the angle T is between 60° and 85°. The third field of vision 56 is much wider than the first field of vision and the third field of vision is outside of the second field of vision. The sensor 30 in this example provides a third output corresponding to the third imaging function based on radiation detected by the third portion 54 of the sensor 30.

In one example embodiment, the sensor 30 comprises an 11 megapixel detector that is 3840×2880×2.5 um with a color filter. The first imaging function in one example embodiment is an automated driver assist function, such as object detection, which may be used for various features such as collision avoidance. The second imaging function is a digital video recorder (DVR) imaging function that may be useful for a variety of purposes onboard a vehicle. The third imaging function in this example is a front side view detecting function useful for detecting objects in a vicinity of a vehicle. In one such example, the first output from the sensor may include monochrome image data or color image data, the second sensor output comprises color image data and the third sensor output comprises color image data.

Figure 4:
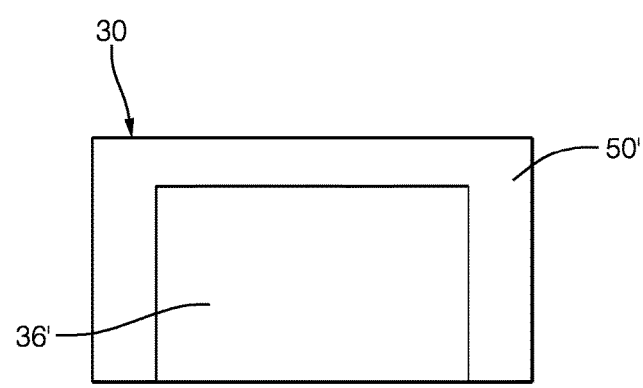
FIG. 4 schematically illustrates an alternative sensor configuration.

FIG. 4 schematically illustrates another sensor configuration in which the first sensor portion 36' occupies more of the detecting surface area compared to the first portion 36 shown in FIG. 3. In this example, a second portion 50' of the sensor 30 has a second field of view that is wider than the first field of view of the first portion 36'. In this example, only two imaging functions are provided so only two different portions of the sensor 30 provide outputs corresponding to two different imaging functions. In one such example, the sensor 30 comprises a two megapixel 1600× 1200×3 um detector. The first imaging function in this example may be useful for driver assist functions onboard a vehicle and the second imaging function may be useful for side view object detection.

Figure 5:
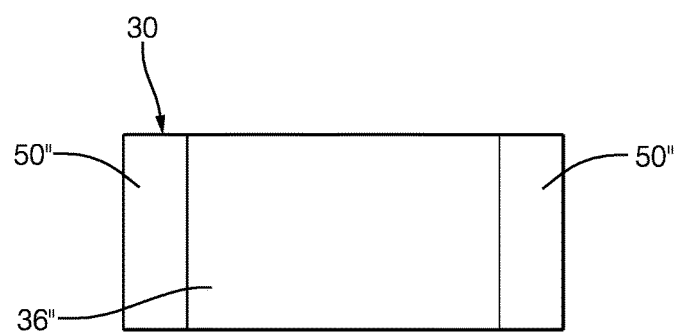
FIG. 5 illustrates another example sensor configuration.

FIG. 5 illustrates another example sensor configuration in which the first portion 36" occupies a central portion of the sensor detecting surface area and the second portion 50" occupies generally rectangular portions near the lateral outside edges of the sensor detecting surface area. The first portion 36" provides an output for a first imaging function, such as driver assist functions. The second portion 50" provides a second output that may be useful for front side view camera imaging purposes, for example. In one example embodiment, the sensor 30 comprises a 2 megapixel 1920× 1080×3 um detector.

Figure 6:
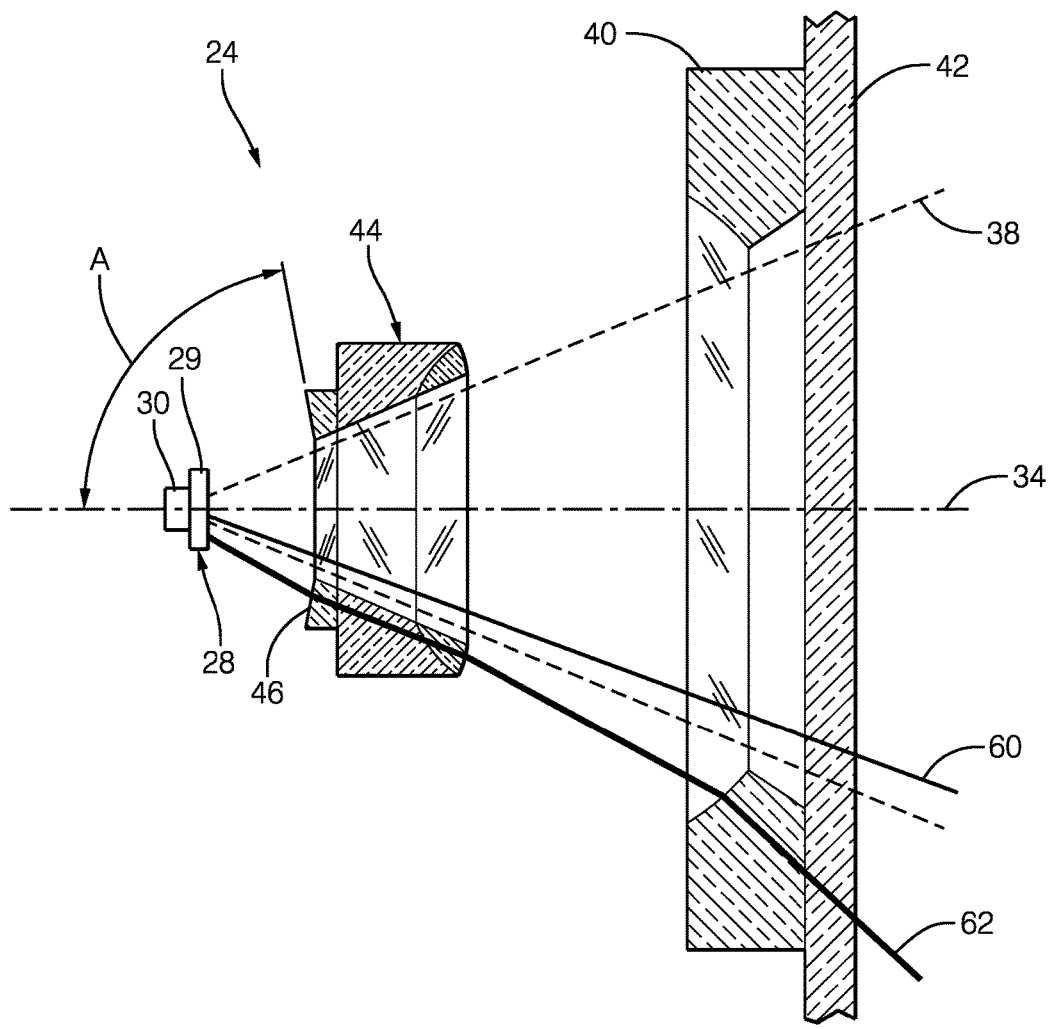
FIG. 6 schematically illustrates selected features of the embodiment of FIG. 2.

As can be appreciated from FIG. 6, radiation, such as visible light, schematically shown at 60 within the first field of vision having the outside edge 38 reaches the sensor 30 without being affected by the distortion correcting prism 40 or the lens element 44. In this example, the distortion correcting prism 40 includes a central portion that is configured to not have any effect on the radiation within the first field of vision of the sensor 30. In this particular example, the central portion of the distortion correcting prism 40 is cored or removed and the distortion correcting prism 40 has a ring-shape.

The lens element 44 in this example is also cored or has its central portion removed to avoid any undesired diffraction of the radiation 60 prior to being detected by the sensor 30.

As shown at 62, radiation outside of the first field of vision is first diffracted by the distortion correcting prism 40 and then diffracted by the lens element 44 such that it is directed to the sensor 30 even though the radiation is outside of the first field of vision. The surface 46 on the lens element 44 effectively shifts the focus of the sensor 30 so that radiation from the wider field of view passing through the distortion correcting prism 40 may be detected by the second or third portions of the sensor 30.

Figure 7:
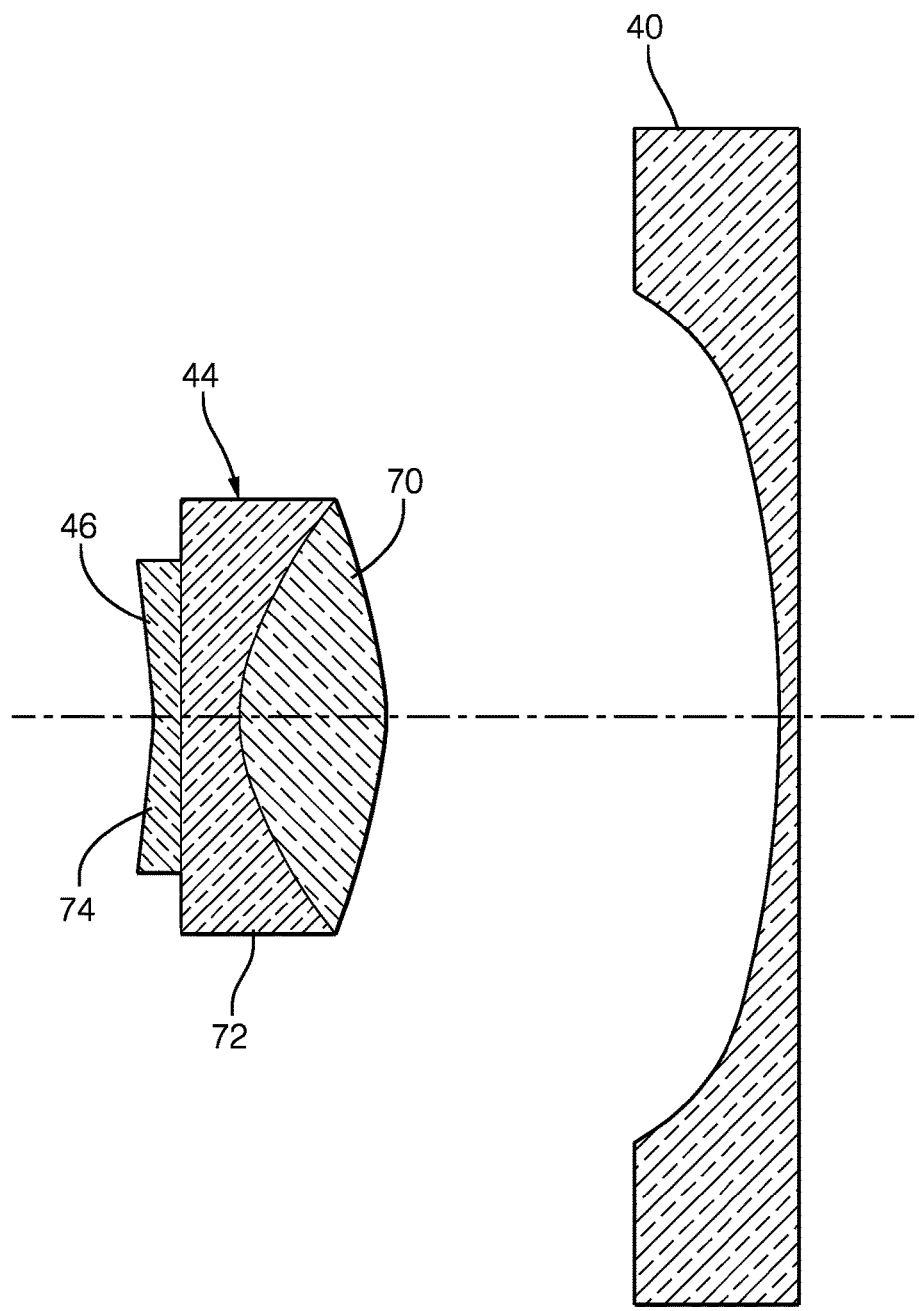
FIG. 7 illustrates components useful for realizing a distortion correcting prism and lens element of an example camera device embodiment.

In one example, the lens element 44 comprises a triplet. An example triplet is schematically shown in FIG. 7 prior to the central portion of the lens element 44 having been removed. In this example, a first lens portion 70 has an aspherical surface facing away from the sensor 30. A second lens portion 72 is an aspherical plano convex lens. The surface 46 is provided on a lens portion 74 with the surface 46 tilted at an oblique angle relative to the sensor axis 34. As can be appreciated from FIG. 7, in the illustrated condition the surface 46 is generally conical and symmetric about the sensor axis 34.

Given the desire to have a much wider field of vision than the first field of vision having the outside edge 38, the distortion correcting prism 40 is challenging to manufacture as an aspherical plano concave lens. The depth of the concavity of such a lens for achieving a wide field of view results in such a thin central portion that it is advantageous to remove the central portion or to manufacture the distortion correcting prism 40 as a ring without a central portion. Removing the central portion of the lens element 44 avoids any undesired diffraction of light (or other radiation of interest) within the first field of view.

Given this description, those skilled in the art will be able to select appropriate lens materials and a manufacturing process that suits their particular needs. For example, the distortion correcting prism 40 and the lens element 44 may be manufactured with a material core that is later removed or may be made having a ring shape without any lens material in the central portion.

The example camera device configurations allow for using a single detector to realize multiple imaging functions. Significantly different fields of view are utilized for different imaging purposes. The distortion correcting prism 40 and the lens element 44 having the surface 46 at the oblique angle relative to the sensor axis accommodate radiation from a much wider field of view allowing for greater versatility and different imaging capabilities from a single camera device. The disclosed example embodiments provide a cost-effective, space-saving, multipurpose camera device that is useful on automotive vehicles.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A camera device, comprising: a sensor configured to detect radiation, a first portion of the sensor being used for a first imaging function, the first portion of the sensor having a first field of vision; a distortion correcting prism forward of the sensor, the distortion correcting prism directing radiation outside of the first field of vision toward the sensor; and a lens element between the distortion correcting prism and the sensor, the lens element including a surface facing toward the sensor, the surface being at an oblique angle relative to a sensor axis, the lens element directing radiation from the distortion correcting prism toward a second portion of the sensor, the second portion of the sensor being used for a second imaging function that is different than the first imaging function, the second portion of the sensor having a second field of vision outside of the first field of vision, wherein: the sensor provides a first output for the first imaging function based on radiation detected at the first portion of the sensor and the sensor provides a second output for the second imaging function based on radiation detected at the second portion, the sensor has a rectangular sensing surface area, the first portion of the sensor corresponds to a first rectangular portion of the sensing surface area, the first rectangular portion is centered within the sensing surface area, the first rectangular portion is symmetric about the sensor axis, the second portion of the sensor corresponds to second rectangular portions of the sensing surface area between the first rectangular portion and an outside edge of the sensing surface area, a third sensor portion is used for a third imaging function, and the third sensor portion corresponds to third rectangular portions of the sensing surface area between the second rectangular portions of the sensing surface area and the outside edge of the sensing surface area.

2. The camera device of claim 1, wherein the second field of vision is wider than the first field of vision.

3. The camera device of claim 1, wherein the first imaging function comprises a driver assist function; and the second imaging function comprises at least one of a digital video recorder (DVR) function and a side view sensor function.

4. The camera device of claim 1, wherein the first imaging function is based on radiation in the visible light spectrum; and the second imaging function is based on radiation in the visible light spectrum.

5. The camera device of claim 4, wherein the first output is one of monochrome image data or color image data; and the second output comprises color image data.

6. The camera device of claim 1, wherein the oblique angle of the surface is between 80° and 89° relative to the sensor axis.

7. The camera device of claim 1, wherein the surface of the lens element is conical and symmetrical about the sensor axis.

8. The camera device of claim 7, wherein
the lens element includes a central portion;
the surface of the lens element is situated outside of the central portion;
radiation detected by the first portion of the sensor passes through the central portion; and
radiation detected by the second portion of the sensor passes through the surface of the lens element.

9. The camera device of claim 1, wherein
the third portion of the sensor has a third field of vision outside of the second field of vision; and
the third portion of the sensor detects radiation that passes through the distortion correcting prism and the surface of the lens element.

10. The camera device of claim 9, wherein
the first imaging function comprises a driver assist function;
the second imaging function comprises a digital video recorder (DVR) function; and
the third imaging function comprises a side view sensor function.

11. The camera device of claim 9, wherein
the first field of vision has a first outside edge that is between 25° and 40° from the sensor axis;
the second field of vision has a second outside edge that is between 40° and 65° from the sensor axis; and
the third field of vision has a third outside edge that is between 60° and 85° from the sensor axis.

12. The camera device of claim 1, wherein the distortion correcting prism comprises a ring-shaped prism.

13. The camera device of claim 12, wherein
radiation detected by the first portion of the sensor is unaffected by the distortion correcting prism; and
radiation detected by the first portion of the sensor is unaffected by a portion of the lens element that includes the surface.

14. The camera device of claim 1, wherein the second rectangular portions are situated on all four sides of the first rectangular portion.

15. A camera device, comprising:
a sensor configured to detect radiation, a first portion of the sensor being used for a first imaging function, the first portion of the sensor having a first field of vision;
a distortion correcting prism forward of the sensor, the distortion correcting prism directing radiation outside of the first field of vision toward the sensor;
a lens element between the distortion correcting prism and the sensor, the lens element including a surface facing toward the sensor, the surface being at an oblique angle relative to a sensor axis, the lens element directing radiation from the distortion correcting prism toward a second portion of the sensor, the second portion of the sensor being used for a second imaging function that is different than the first imaging function, the second portion of the sensor having a second field of vision outside of the first field of vision;
wherein:
the sensor provides a first output for the first imaging function based on radiation detected at the first portion of the sensor and the sensor provides a second output for the second imaging function based on radiation detected at the second portion;

a third portion of the sensor is used for a third imaging function;

the third portion of the sensor has a third field of vision outside of the second field of vision;

the third portion of the sensor detects radiation that passes through the distortion correcting prism and the surface of the lens element;

the first field of vision has a first outside edge that is between 25° and 40° from the sensor axis;

the second field of vision has a second outside edge that is between 40° and 65° from the sensor axis; and the third field of vision has a third outside edge that is between 60° and 85° from the sensor axis.

16. The camera device of claim 15, wherein the sensor has a rectangular sensing surface area; the first portion of the sensor corresponds to a first rectangular portion of the sensing surface area, the first rectangular portion being centered within the sensing surface area, the first rectangular portion being symmetric about the sensor axis; and the second portion of the sensor corresponds to second rectangular portions of the sensing surface area between the first rectangular portion and an outside edge of the sensing surface area.

17. The camera device of claim 16, comprising a third sensor portion that is used for a third imaging function and wherein the third sensor portion corresponds to third rectangular portions of the sensing surface area between the second rectangular portions of the sensing surface area and the outside edge of the sensing surface area.

18. The camera device of claim 15, wherein radiation detected by the first portion of the sensor is unaffected by the distortion correcting prism; and radiation detected by the first portion of the sensor is unaffected by a portion of the lens element that includes the surface.

19. A camera device, comprising:

a sensor configured to detect radiation, a first portion of the sensor being used for a first imaging function, the first portion of the sensor having a first field of vision;

a ring-shaped distortion correcting prism forward of the sensor, the ring-shaped distortion correcting prism having an open central portion, the distortion correcting prism directing radiation outside of the first field of vision toward the sensor; and a lens element between the distortion correcting prism and the sensor, the lens element including a surface facing toward the sensor, the surface being at an oblique angle relative to a sensor axis, the lens element directing radiation from the distortion correcting prism toward a second portion of the sensor, the second portion of the sensor being used for a second imaging function that is different than the first imaging function, the second portion of the sensor having a second field of vision outside of the first field of vision;

wherein the sensor provides a first output for the first imaging function based on radiation detected at the first portion of the sensor and the sensor provides a second output for the second imaging function based on radiation detected at the second portion;

wherein radiation that passes through the open central portion is unaffected by the distortion correcting prism; and wherein radiation detected by the first portion of the sensor is unaffected by the distortion correcting prism and is unaffected by a portion of the lens element that includes the surface.

* * * * *